US009392455B2

(12) United States Patent
Du et al.

(10) Patent No.: US 9,392,455 B2
(45) Date of Patent: Jul. 12, 2016

(54) METHOD AND APPARATUS FOR HANDLING CLOSED SUBSCRIBER GROUPS IN RELAY-ENHANCED SYSTEM

(75) Inventors: Lei Du, Beijing (CN); Wei Hua Zhou, Beijing (CN); Bernhard Raaf, Neuried (DE); Maciej Pakulski, Czernica (PL)

(73) Assignee: Nokia Solutions and Networks Oy, Espoo (FI)

( * ) Notice: Subject to any disclaimer, the term of this patent is extended or adjusted under 35 U.S.C. 154(b) by 208 days.

(21) Appl. No.: 13/884,657

(22) PCT Filed: Nov. 11, 2010

(86) PCT No.: PCT/CN2010/001806
§ 371 (c)(1),
(2), (4) Date: Jun. 24, 2013

(87) PCT Pub. No.: WO2012/061955
PCT Pub. Date: May 18, 2012

(65) Prior Publication Data
US 2013/0273890 A1     Oct. 17, 2013

(51) Int. Cl.
*H04W 12/06* (2009.01)
*H04W 4/08* (2009.01)
*H04W 48/02* (2009.01)
*H04W 84/04* (2009.01)

(52) U.S. Cl.
CPC ............... *H04W 12/06* (2013.01); *H04W 4/08* (2013.01); *H04W 48/02* (2013.01); *H04W 84/047* (2013.01)

(58) Field of Classification Search
None
See application file for complete search history.

(56) References Cited

U.S. PATENT DOCUMENTS

2009/0093232 A1*   4/2009   Gupta et al. .................. 455/410
2009/0094351 A1*   4/2009   Gupta et al. .................. 709/220

(Continued)

FOREIGN PATENT DOCUMENTS

CN    101801063 A    8/2010
CN    101855919 A    10/2010

(Continued)

OTHER PUBLICATIONS

IEEE Std. 802.16-2009 (Revision of IEEE Std. 802:16-2004) "IEEE Standard for Local and metropolitan area networks; Part 16: Air Interface for Broadband Wireless Access Systems"; IEEE Computer Society and the IEEE Microwave Theory and Techniques Society; Sponsored by the LAN/MAN Standards Committee; IEEE, 3 Park Avenue, New York, NY 10016-5997, USA; May 29, 2009; pp. 1-2082.

(Continued)

*Primary Examiner* — Diane Mizrahi
(74) *Attorney, Agent, or Firm* — Harrington & Smith

(57) ABSTRACT

A method and an apparatus for handling closed subscriber groups in a relay-enhanced system are provided in the invention. The method includes: retrieving setting information relating to closed subscriber groups of a donor base station and a relay node of a relay-enhanced cellular system; acquiring a whitelist defining one or more closed subscriber groups in which a terminal is a member, the terminal requesting access to the relay-enhanced cellular system via the relay node; and verifying (i.e. checking and/or validating) a membership of the terminal for both closed subscriber groups of the donor base station and the relay node based on the retrieved setting information and the acquired whitelist. With the method and apparatus of the invention, user access control via the relay node in the relay-enhanced access networks can be improved.

27 Claims, 12 Drawing Sheets

(56) References Cited

U.S. PATENT DOCUMENTS

| | | |
|---|---|---|
| 2013/0016330 A1 | 1/2013 | Yun et al. |
| 2013/0053048 A1 | 2/2013 | Garcia et al. |
| 2013/0273890 A1 | 10/2013 | Du et al. |
| 2013/0322389 A1* | 12/2013 | Maeda et al. ............. 370/329 |
| 2014/0220934 A1* | 8/2014 | Zhang et al. ............. 455/410 |
| 2014/0301371 A1* | 10/2014 | Maeda et al. ............. 370/331 |
| 2015/0092554 A1* | 4/2015 | Mochizuki et al. ......... 370/235 |

FOREIGN PATENT DOCUMENTS

| | | |
|---|---|---|
| CN | 101861754 A | 10/2010 |
| WO | WO 2009/115897 A1 | 9/2009 |
| WO | WO 2010113528 A1 | 10/2010 |

OTHER PUBLICATIONS

Qualcomm Incorporated, 3GPP TSG-RAN WG3 #70, R3-103410, "Relay attach indication to MME", Jacksonville, USA, Nov. 15-19, 2010, 12 pages.

CATT, 3GPP TSG RAN WG3#70, R3-103393, "How to differentiate two phases of RN startup procedure", Jacksonville, US, Nov. 2010, 3 pages.

Qualcomm Incorporated, 3GPP TSG-RAN WG3 #69BIS, R3-102907, "GW Selection for Relay", Xi'an, China, Oct. 2010, 3 pages.

ETSI TS 136 413 V9.4.0, LTE; Evolved Universal Terrestrial Radio Access Network (E-UTRAN); S1 Application Protocol (S1AP) (3GPP TS 36.413 version 9.4.0 Release 9), Oct. 2010, 245 pages.

* cited by examiner

METHOD AND APPARATUS FOR HANDLING CLOSED SUBSCRIBER GROUPS IN RELAY-ENHANCED SYSTEM

FIELD OF THE INVENTION

The present invention relates to closed subscriber groups in a relay-enhanced system in general, and the handling thereof in particular.

BACKGROUND OF THE INVENTION

In the development of radio communication systems, such as mobile communication systems (like for example GSM (Global System for Mobile Communication), GPRS (General Packet Radio Service), UMTS (Universal Mobile Telecommunication System) or the like), efforts are made for an evolution of the radio access part thereof. In this regard, the evolution of radio access networks (like for example the GSM EDGE radio access network (GERAN) and the Universal Terrestrial Radio Access Network (UTRAN) or the like) is currently addressed. Such improved radio access networks are sometimes denoted as evolved radio access networks (like for example the Evolved Universal Terrestrial Radio Access Network (E-UTRAN)) or as being part of a long-term evolution (LTE) or LTE-Advanced. Although such denominations primarily stem from 3GPP (Third Generation Partnership Project) terminology, the usage thereof hereinafter does not limit the respective description to 3GPP technology, but generally refers to any kind of radio access evolution irrespective of the underlying system architecture. Another example for an applicable broadband access system may for example be IEEE 802.16 also known as WiMAX (Worldwide Interoperability for Microwave Access).

In the following, for the sake of intelligibility, LTE (Long-Term Evolution according to 3GPP terminology) or LTE-Advanced is taken as a non-limiting example for a broadband radio access network being applicable in the context of the present invention and its embodiments. However, it is to be noted that any kind of radio access network may likewise be applicable, as long as it exhibits comparable features and characteristics as described hereinafter.

In the development of cellular systems in general, and access networks in particular, relaying has been proposed as one concept. In relaying, a terminal or user equipment (UE) is not directly connected with an access node such as a radio base station (e.g. denoted as eNodeB or eNB) of a radio access network (RAN), but via a relay node (RN) which is connected to the access node. Relaying by way of relay nodes has been proposed as a concept for coverage extension in cellular systems. Apart from this main goal of coverage extension, introducing relay concepts can also help in providing high-bit-rate coverage in high shadowing environments, reducing the average radio-transmission power at the a user equipment (thereby leading to long battery life), enhancing cell capacity and effective throughput, (e.g. increasing cell-edge capacity and balancing cell load), and enhancing overall performance and deployment cost of radio access networks.

FIG. 1 shows a schematic diagram of a typical deployment scenario of a relay-enhanced cellular system, such as e.g. a LTE or LTE-Advanced RAN with radio-relayed extensions. As shown in FIG. 1, UEs at disadvantaged positions such as a cell edge and/or high shadowing areas are connected to a so-called donor base station (DeNB) via a respective relay node RN. Generally, any one of the relay nodes may be stationary/fixed or mobile.

The coverage or service area of a relay node may be referred to as relay cell, and the coverage or service area of a donor base station may be referred to as donor cell. Accordingly, both the DeNB as well as the RNs may be regarded as access nodes or base stations of an access network, possibly as access nodes or base stations of different hierarchical level in terms of logical and/or structural network deployment.

FIG. 2 shows a schematic diagram of an interface definition of a relay-enhanced cellular system. As shown in FIG. 2, the (wireless) link between donor base station (DeNB) and relay node (RN) may be referred to as Un link or relay link, and the (wireless) link between the relay node (RN) and the terminal or user equipment (UE) may be referred to as Uu link or access link.

In the context of LTE and LTE-Advanced, a Layer 3 (L3) RN, also referred to as Type I RN, is currently taken as a baseline case for the study on relay extensions. Such a relay node is exemplarily assumed for the further description. The Type I relay node appears as a normal base station (eNB) towards its served terminals or user equipments (UE), and appears as a terminal or user equipment towards it serving donor base station (DeNB). The Type I relay node performs proxy functionality as to relay traffic and signaling between UE and DeNB.

In the development of cellular systems in general, and access networks in particular, the concept of closed subscriber groups (CSG) has been proposed. A cell with a closed subscriber group (CSG), also referred to as CSG cell is only allowed to be accessed by a terminal or user equipment when this terminal or user equipment is a member of the CSG of that cell or, stated in other words, is a member of that cell. In this regard, the parameters csg-indication and csg-identity are defined as CSG-related parameters for handling and managing access of CSG cells. The parameter csg-indication indicates whether or not a cell is a CSG cell, and the parameter csg-identity defines the identity of the CSG within the cellular system the cell belongs to. When csg-indication is set to TRUE for a specific cell, the terminal or user equipment is only allowed to access this cell, if the csg-identity matches an entry in the CSG whitelist being stored in the terminal or user equipment.

The concept of closed subscriber groups is also applicable to relay-enhanced cellular systems. In such case, any relay cell may be a CSG cell or not, and any donor cell may be a CSG cell or not. The CSG-related parameters of the individual cells may be transferred by being included in System Information Block 1 (SIB1) according to current specifications so as to be advertised between RN and DeNB.

In a relay-enhanced cellular system supporting the CSG concept, a two-fold user access control procedure is specified to be conducted. That is, a CSG membership may be checked at the RAN (radio access network) side, and (if successful) a CSG membership may be validated at the CN (core network, e.g. evolved packet core (EPC)) side.

A user (i.e. its UE) trying to get access to a cellular system via a relay cell, has to be member of the CSG relay cell (if the relay cell is a CSG cell) while the donor cell is invisible to the user.

No problems arise in this regard when, as conventionally, a relay cell is always configured with the same CSG settings as its serving donor cell. However, such restriction is undesirable and/or inappropriate in view of current demands e.g. in terms of flexibility of deployment and usage.

When a relay cell may be configured with different CSG settings as its serving donor cell (which may easily be the case e.g. when the corresponding system information is configured independently, e.g. by RN OAM for the relay cell and by DeNB OAM for the donor cell), problems may arise for the CSG membership check at the RAN side, if the DeNB represents a CSG cell while the RN does not represent a CSG cell, and/or if both DeNB and RN represent CSG cells but the RN has a different CSG identity as compared with its DeNB.

FIG. 3 shows a schematic diagram of an exemplary deployment scenario of a relay-enhanced cellular system where the DeNB represents a CSG cell while the RN does not represent a CSG cell.

As shown in FIG. 3, the DeNB represents a CSG cell where the csg-indication is set to true and the csg-identity is advertised to its coverage including the RN. The RN is an open cell with csg-indication set to false. If the csg-identity is not in the UE's whitelist, i.e. the UE is not a member of the DeNB or its cell, the UE in position A is not allowed to access to the DeNB. However, if the UE moves to position B which locates in the coverage of the RN, the UE is able to access the open cell of the RN and, therefore, to use back-haul resources between the DeNB and the RN. That is, the existence of the RN and its open cell allows the invasion of non-member UEs to the DeNB and the consumption of the radio resource of the DeNB, which violates the proprietary feature of CSG cells.

FIG. 4 shows a schematic diagram of an exemplary deployment scenario of a relay-enhanced cellular system where both DeNB and RN represent CSG cells but the RN has a different CSG identity as compared with its DeNB.

As shown in FIG. 4, both the DeNB and the RN represent CSG cells but with different CSG identities. A conceivable scenario of such deployment situation may for example be in an office environment, where the DeNB is deployed to provide coverage to the whole building, while the RN is implemented in each floor to serve the staff in the floor only. If the UE (i.e. an entry in its CSG whitelist) matches only the csg-identity of the RN (but not the csg-identity of the DeNB), the UE could access to the RN and then, via the RN, to the DeNB indirectly. That is, the existence of the RN and its differently set CSG cell allows the invasion of non-member UEs to the DeNB and the consumption of the radio resource of the DeNB, which violates the proprietary feature of CSG cells.

In view thereof, mechanisms are needed for a correct membership handling of CSG cells in relay-enhanced cellular systems at the RAN side.

When both relay cell and a donor cell may be configured as CSG cells, further problems (besides the above problems regarding CSG membership check at the RAN side), may arise for the CSG membership validation at the CN side.

Conventionally, after a connection is established between DeNB and RN and between RN and UE, the UE sends an Attach Request message. The RN then includes the Attach Request message together with, among others, its csg-identity (hereinafter denoted as CSG ID) into the initial UE message and then sends this initial UE message to the DeNB (e.g. as in the S1AP protocol). According to an agreed architecture for relay-enhanced cellular systems in 3GPP, the DeNB performs the proxy functionality. Thus, the same message with the RN CSG ID is forwarded to the mobility management entity (MME) at the core network such as the evolved packet core (EPC), or the DeNB replaces the RN CSG ID with its own CSG ID, i.e. the DeNB CSG ID, and forwards it to the MME at the core network. Since the RN is invisible to the MME according to current relay architectures, the MME may only consider the single CSG ID included in this initial UE message as CSG ID of the DeNB, irrespective of whether it is the DeNB CSG ID or the RN CSG ID. Upon receiving this message with the single CSG ID, the MME validates the UE's membership according to the CSG ID included. That is, whatever the DeNB proxies (RN CSG ID or DeNB CSG ID), the MME only sees one CSG ID and may, thus, handle (the validation of) the CSG membership of the UE only with this single CSG ID. That is, the coexistence of the RN CSG cell and the DeNB CSG cell impedes a proper handling of CSG memberships for all deployment levels of a relay-enhanced cellular system, which violates the proprietary feature of CSG cells.

In view thereof, mechanisms are needed for a correct membership handling of CSG cells in relay-enhanced cellular systems at the CN side.

Thus, there do not exist any feasible mechanisms for properly and correctly handling closed subscriber groups in a relay-enhanced system, such as for example in relay-enhanced access networks.

Accordingly, there is a demand for mechanisms for properly and correctly handling closed subscriber groups in a relay-enhanced system.

SUMMARY OF EMBODIMENTS OF THE INVENTION

The present invention and its embodiments aim at solving or at least mitigating the above problems.

The present invention and its embodiments are made to provide for feasible mechanisms for properly and correctly handling closed subscriber groups in a relay-enhanced system.

According to an exemplary first aspect of the present invention, there is provided a method comprising retrieving setting information relating to closed subscriber groups of a donor base station and a relay node of a relay-enhanced cellular system, acquiring a whitelist defining one or more closed subscriber groups in which a terminal is a member, said terminal requesting access to the relay-enhanced cellular system via the relay node, and verifying a membership of the terminal for both closed subscriber groups of the donor base station and the relay node based on the retrieved setting information and the acquired whitelist.

According to further developments or modifications thereof, one or more of the following applies:

the method further comprises allowing access of the terminal to the relay-enhanced cellular system via the relay node, when said verifying yields that the terminal is a member of both closed subscriber groups of the donor base station and the relay node, the setting information comprise at least one of an identity of the closed subscriber group of the donor base station and an identity of the closed subscriber group of the relay node, the verifying comprises comparing any one of the identities of the closed subscriber groups with entries in the whitelist, and the verifying yields that the terminal is a member of both closed subscriber groups of the donor base station and the relay node, when each identity matches with an entry in the whitelist, the method is operable at or by a mobility management entity associated with the relay-enhanced cellular system, the retrieving comprises receiving the setting information relating to both closed subscriber groups of the donor base station and the relay node from the donor base station, and/or the setting information is included in an initial terminal message transferring an attach request of the terminal, and/or the acquiring comprises receiving the whitelist via the donor base station or locally obtaining the whitelist from a local storage of the mobility management entity, and/or the method further comprises sending an attach accept or reject message to the donor base station depending on the result of the membership verifying, the method is operable at or by the terminal, the retrieving comprises receiving the setting information relating to both closed subscriber groups of the donor base station and the relay node from the relay node, and/or the setting information is included in system information, and/or the acquiring comprises locally obtaining the whitelist at the terminal, and/or the whitelist is obtained from a local storage of the terminal, the setting information comprises setting information relating to the closed subscriber group of the donor base station being set as setting information relating to the closed subscriber group of the relay node, or the setting information comprises both setting information relating to the closed subscriber group of the donor base station and setting information relating to the closed subscriber group of the relay node, the method is operable at or by the relay node, the retrieving comprises receiving the setting information relating to the closed subscriber group of the donor base station from the donor base station and obtaining the setting information relating to the closed subscriber group of the relay node at the relay node or from a remote entity, and/or the setting information relating to the closed subscriber group of the donor base station is included in system information, and/or the setting information relating to the closed subscriber group of the relay node is obtained from a local storage of the relay node, the acquiring comprises receiving the whitelist from the terminal, and/or the whitelist is included in a connection establishment message, and/or the method further comprises sending a connection establishment accept or reject message to the terminal depending on the result of the membership verifying, and/or the donor base station and/or the relay node is part of an evolved radio access network in accordance with LTE and/or LTE-Advanced specifications.

According to an exemplary second aspect of the present invention, there is provided an apparatus comprising a processor configured to retrieve setting information relating to closed subscriber groups of a donor base station and a relay node of a relay-enhanced cellular system, acquire a whitelist defining one or more closed subscriber groups in which a terminal is a member, said terminal requesting access to the relay-enhanced cellular system via the relay node, and verify a membership of the terminal for both closed subscriber groups of the donor base station and the relay node based on the retrieved setting information and the acquired whitelist.

According to further developments or modifications thereof, one or more of the following applies:

the processor is further configured to allow access of the terminal to the relay-enhanced cellular system via the relay node, when said verifying yields that the terminal is a member of both closed subscriber groups of the donor base station and the relay node, the setting information comprise at least one of an identity of the closed subscriber group of the donor base station and an identity of the closed subscriber group of the relay node, the processor, for verifying, is further configured to compare any one of the identities of the closed subscriber groups with entries in the whitelist, and the processor, for verifying, is further configured to yield that the terminal is a member of both closed subscriber groups of the donor base station and the relay node, when each identity matches with an entry in the whitelist, the apparatus is operable as or at a mobility management entity associated with the relay-enhanced cellular system, the apparatus further comprises a receiver configured to and/or the processor is further configured to receive the setting information relating to both closed subscriber groups of the donor base station and the relay node from the donor base station, and/or the setting information is included in an initial terminal message transferring an attach request of the terminal, and/or the apparatus further comprises a receiver configured to and/or the processor, for acquiring, is further configured to receive the whitelist via the donor base station, or the processor, for acquiring, is further configured to locally obtain the whitelist from a local storage of the mobility management entity, and/or the apparatus further comprises a transmitter configured to and/or the processor is further configured to send an attach accept or reject message to the donor base station depending on the result of the membership verifying, the apparatus is operable as or at the terminal, the apparatus further comprises a receiver configured to and/or the processor is further configured to receive the setting information relating to both closed subscriber groups of the donor base station and the relay node from the relay node, and/or the setting information is included in system information, and/or the processor, for acquiring, is further configured to locally obtain the whitelist at the terminal, and/or the apparatus further comprises a local storage storing the whitelist, wherein the whitelist is obtainable from the local storage of the terminal, the setting information comprises setting information relating to the closed subscriber group of the donor base station being set as setting information relating to the closed subscriber group of the relay node, or the setting information comprises both setting information relating to the closed subscriber group of the donor base station and setting information relating to the closed subscriber group of the relay node, the apparatus is operable as or at the relay node, the apparatus further comprises a local storage storing the whitelist, wherein the whitelist is obtainable from the local storage of the terminal, and/or the apparatus further comprises a receiver configured to and/or the processor is further configured to receive the setting information relating to the closed subscriber group of the donor base station from the donor base station, and the processor is further configured to obtain the setting information relating to the closed subscriber group of the relay node at the relay node or from a remote entity, and/or the setting information relating to the closed subscriber group of the donor base station is included in system information, the apparatus further comprises a receiver configured to and/or the processor is further configured to receive receiving the whitelist from the terminal, and/or the whitelist is included in a connection establishment message, and/or the apparatus further comprises a transmitter configured to and/or the processor is further configured to send a connection establishment accept or reject message to the terminal depending on the result of the membership verifying, and/or the donor base station and/or the relay node is part of an evolved radio access network in accordance with LTE and/or LTE-Advanced specifications.

According to an exemplary third aspect of the present invention, there is provided a method comprising procuring membership verification information for verifying a membership of a terminal for at least one closed subscriber group, said terminal requesting access to a relay-enhanced cellular system via a relay node, and providing the procured membership verification information to an entity in charge of verifying the membership of the terminal.

According to further developments or modifications thereof, one or more of the following applies:

said membership verification information comprise setting information relating to at least one of closed subscriber groups of a donor base station and a relay node of the relay-enhanced cellular system or a whitelist defining one or more closed subscriber groups in which the terminal is a member, the setting information comprise at least one of an identity of the closed subscriber group of the donor base station and an identity of the closed subscriber group of the relay node, the method is operable at or by the donor base station, the membership verification information comprise the setting information, and the procuring comprises receiving the setting information relating to the closed subscriber group of the relay node from the relay node, retrieving the setting information relating to the closed subscriber group of the donor base station, and sending both the received setting information and the retrieved setting information to a mobility management entity associated with the relay-enhanced cellular system as the entity in charge of verifying the membership of the terminal, the method is operable at or by the relay node, the membership verification information comprise the setting information, and the procuring comprises receiving the setting information relating to the closed subscriber group of the donor base station from the donor base station, using the received setting information as the setting information, and sending the setting information to the terminal as the entity in charge of verifying the membership of the terminal, the method further comprises retrieving the setting information relating to the closed subscriber group of the relay node, and the aligning comprises aligning the received setting information and the retrieved setting information and using the received setting information as the setting information, the membership verification information comprise the setting information, and the procuring comprises receiving the setting information relating to the closed subscriber group of the donor base station from the donor base station, retrieving the setting information relating to the closed subscriber group of the relay node, sending both the received setting information and the retrieved setting information to the terminal as the entity in charge of verifying the membership of the terminal, the method is operable at or by the terminal, the membership verification information comprise the whitelist, and the procuring comprises acquiring the whitelist, and sending the whitelist to the relay node as the entity in charge of verifying the membership of the terminal, and/or the donor base station and/or the relay node is part of an evolved radio access network in accordance with LTE and/or LTE-Advanced specifications.

According to an exemplary fourth aspect of the present invention, there is provided an apparatus comprising a processor configured to procure membership verification information for verifying a membership of a terminal for at least one closed subscriber group, said terminal requesting access to a relay-enhanced cellular system via a relay node, and provide the procured membership verification information to an entity in charge of verifying the membership of the terminal.

According to further developments or modifications thereof, one or more of the following applies:

said membership verification information comprise setting information relating to at least one of closed subscriber groups of a donor base station and a relay node of the relay-enhanced cellular system or a whitelist defining one or more closed subscriber groups in which the terminal is a member, the setting information comprise at least one of an identity of the closed subscriber group of the donor base station and an identity of the closed subscriber group of the relay node, the apparatus is operable as or at the donor base station, the membership verification information comprise the setting information, and the apparatus further comprises a transceiver configured to and/or the processor, for procuring, is further configured to receive the setting information relating to the closed subscriber group of the relay node from the relay node, retrieve the setting information relating to the closed subscriber group of the donor base station, and send both the received setting information and the retrieved setting information to a mobility management entity associated with the relay-enhanced cellular system as the entity in charge of verifying the membership of the terminal, the apparatus is operable as or at the relay node, the membership verification information comprise the setting information, and the apparatus further comprises a transceiver configured to and/or the processor, for procuring, is further configured to receive the setting information relating to the closed subscriber group of the donor base station from the donor base station, use the received setting information as the setting information, and send the setting information to the terminal as the entity in charge of verifying the membership of the terminal, the processor is further configured to retrieve the setting information relating to the closed subscriber group of the relay node, and to align the received setting information and the retrieved setting information and use the received setting information as the setting information, the membership verification information comprise the setting information, and the apparatus further comprises a transceiver configured to and/or the processor, for procuring, is further configured to receive the setting information relating to the closed subscriber group of the donor base station from the donor base station, retrieve the setting information relating to the closed subscriber group of the relay node, and send both the received setting information and the retrieved setting information to the terminal as the entity in charge of verifying the membership of the terminal.

the apparatus is operable as or at the terminal, the membership verification information comprise the whitelist, and the apparatus further comprises a transceiver configured to and/or the processor, for procuring, is further configured to acquire the whitelist, and send the whitelist to the relay node as the entity in charge of verifying the membership of the terminal, and/or the donor base station and/or the relay node is part of an evolved radio access network in accordance with LTE and/or LTE-Advanced specifications.

According to an exemplary fifth aspect of the present invention, there is provided a computer program product including a program comprising software code portions being arranged, when run on a processor of an apparatus (such as e.g. according to the above second aspect and/or developments or modifications thereof), to perform the method according to the above first aspect and/or developments or modifications thereof).

According to an exemplary sixth aspect of the present invention, there is provided a computer program product including a program comprising software code portions being arranged, when run on a processor of an apparatus (such as e.g. according to the above fourth aspect and/or developments or modifications thereof), to perform the method according to the above third aspect and/or developments or modifications thereof).

According to further developments or modifications of the present invention, the computer program product according to the fifth and/or sixth aspect comprises a computer-readable medium on which the software code portions are stored, and/or the program is directly loadable into a memory of the processor.

By way of exemplary embodiments of the present invention, there are provided mechanisms and measures for properly and correctly handling closed subscriber groups in a relay-enhanced system.

By way of exemplary embodiments of the present invention, there are provided mechanisms and measures for facilitating efficient user access control (i.e. assuring a proper CSG handling in user access control) via a relay node in a relay-enhanced system supporting closed subscriber groups for relay and/or donor cells.

By way of exemplary embodiments of the present invention, there are provided mechanisms and measures for a proper CSG membership check for a relay cell at a RAN side and/or a proper CSG membership validation for a donor cell at a CN side.

By way of exemplary embodiments of the present invention, different CSG settings of various (CSG/non-CSG) cells, such as e.g. relay and donor cells, may be taken into account for user access control in a relay-enhanced system.

BRIEF DESCRIPTION OF THE DRAWINGS

In the following, the present invention will be described in greater detail by way of non-limiting examples with reference to the accompanying drawings, in which.

DETAILED DESCRIPTION OF EMBODIMENTS OF THE PRESENT INVENTION

Figure 1:
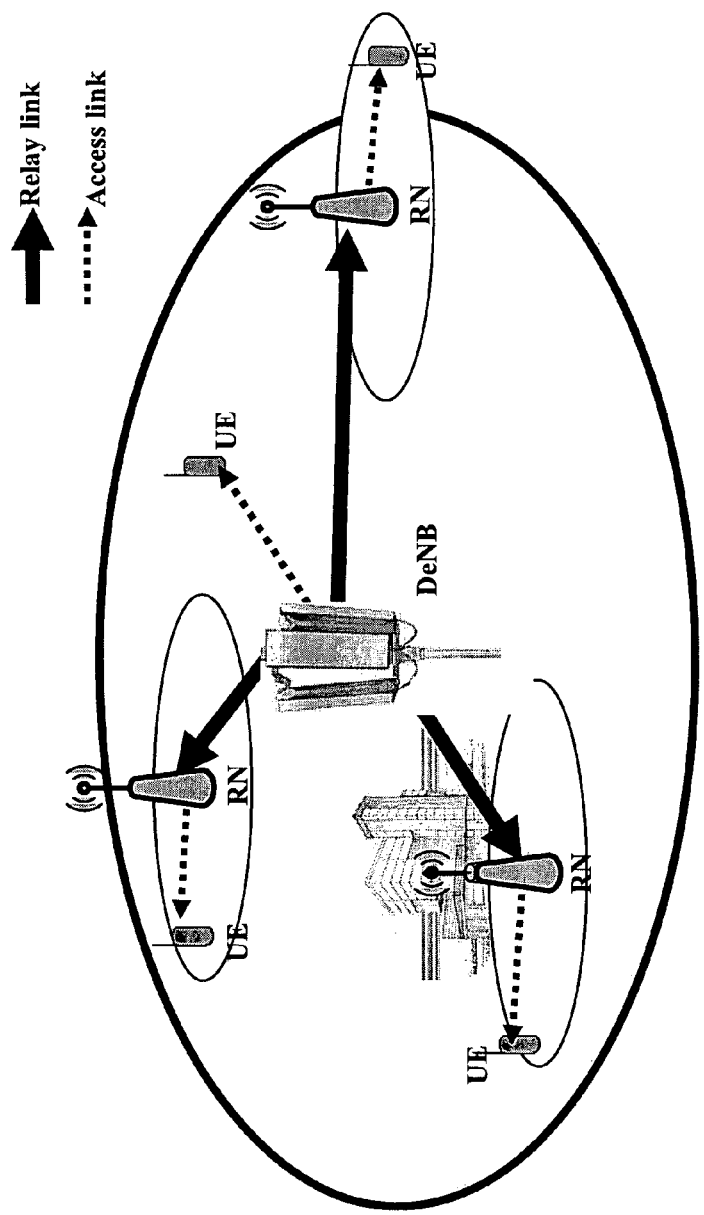
FIG. 1 shows a schematic diagram of a typical deployment scenario of a relay-enhanced cellular system.
Figure 2:
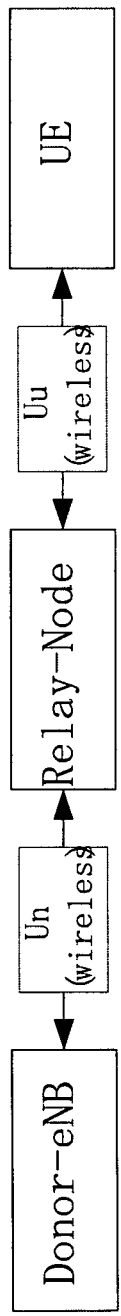
FIG. 2 shows a schematic diagram of an interface definition of a relay-enhanced cellular system.

The present invention is described herein with reference to particular non-limiting examples and to what are presently considered to be conceivable embodiments of the present invention. A person skilled in the art will appreciate that the invention is by no means limited to these examples, and may be more broadly applied.

The present invention and its embodiments are mainly described in relation to 3GPP specifications being used as non-limiting examples for certain exemplary network configurations and deployments. In particular, an LTE (E-UTRAN) radio access network and corresponding standards (LTE releases 8, 9 and LTE-Advanced release 10 and beyond) are used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Generally, embodiments of the present invention may be applicable for/in any kind of modern and future communication network including any conceivable mobile/wireless communication networks according to 3GPP (Third Generation Partnership Project) or IETF (Internet Engineering Task Force) specifications.

In particular, embodiments of the present invention may be applicable in any relay-enhanced cellular system such as for example in any relay-enhanced (cellular) access system where relay nodes/cells and donor nodes/cells exist, both being configurable as open cells and/or CSG cells with arbitrary CSG settings.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

For the description of exemplary embodiments of the present invention, a relay-enhanced cellular system, such as that according to the exemplary illustrations of FIGS. 1 to 4, is used as an exemplary, illustrative and non-limiting basis.

According to exemplary embodiments of the present invention, there are provided mechanisms, measures and means for a proper handling of closed subscriber groups in relay-enhanced systems, thereby enabling e.g. an appropriate and efficient user access control via a relay node of a relay-enhanced access network.

According to exemplary embodiments of the present invention, a proper CSG membership check for a relay cell at a RAN side is facilitated in that the RAN side (i.e. the RN or the UE) is made aware of the CSG memberships of both RN and DeNB, and/or a proper CSG membership validation for a donor cell at a CN side is facilitated in that the CN side (i.e. the MME) is made aware of the CSG memberships of both RN and DeNB.

According to exemplary embodiments of the present invention, it may be advantageously achieved that a relay node is only accessible by a terminal (i.e. a terminal may only access a relay-enhanced system via a relay node thereof) when the terminal is a member of all relevant closed subscriber groups (such as e.g. the RN CSG and/or the DeNB CSG) or, stated in other words, all relevant cells (such as e.g. the relay cell of the RN and/or the donor cell of the DeNB) with closed subscriber groups. That is, it may be advantageously achieved that the proprietary feature of all existing CSGs or CSG cells are properly considered and assured.

In the following, exemplary embodiments of the present invention are described with reference to methods, procedures and functions, as well as with reference to structural arrangements and configurations.

Figure 5:
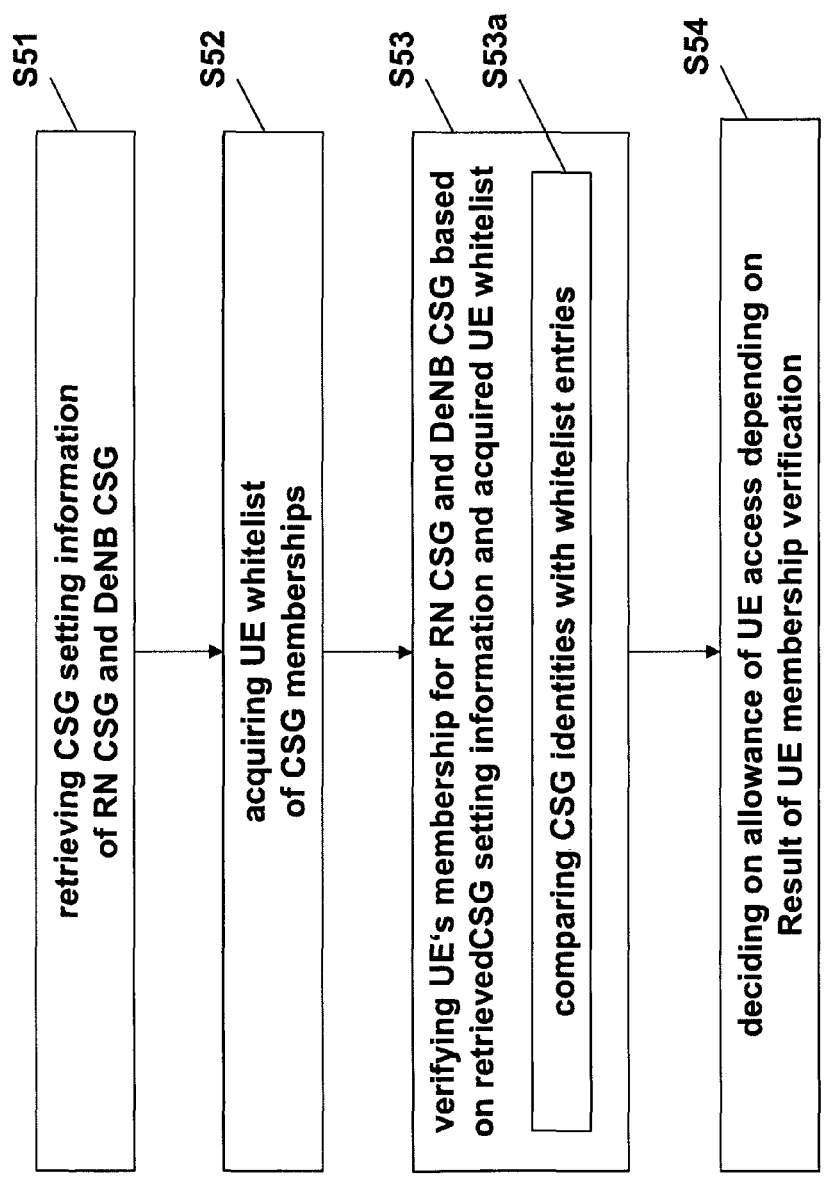
FIG. 5 shows a flowchart of an exemplary method according to exemplary embodiments of the present invention.

FIG. 5 shows a flowchart of an exemplary method according to exemplary embodiments of the present invention.

Figure 7:
FIG. 7 shows a signalling diagram of an exemplary procedure of a CSG membership check for a relay cell at a RAN side according to exemplary embodiments of the present invention.
Figure 8:
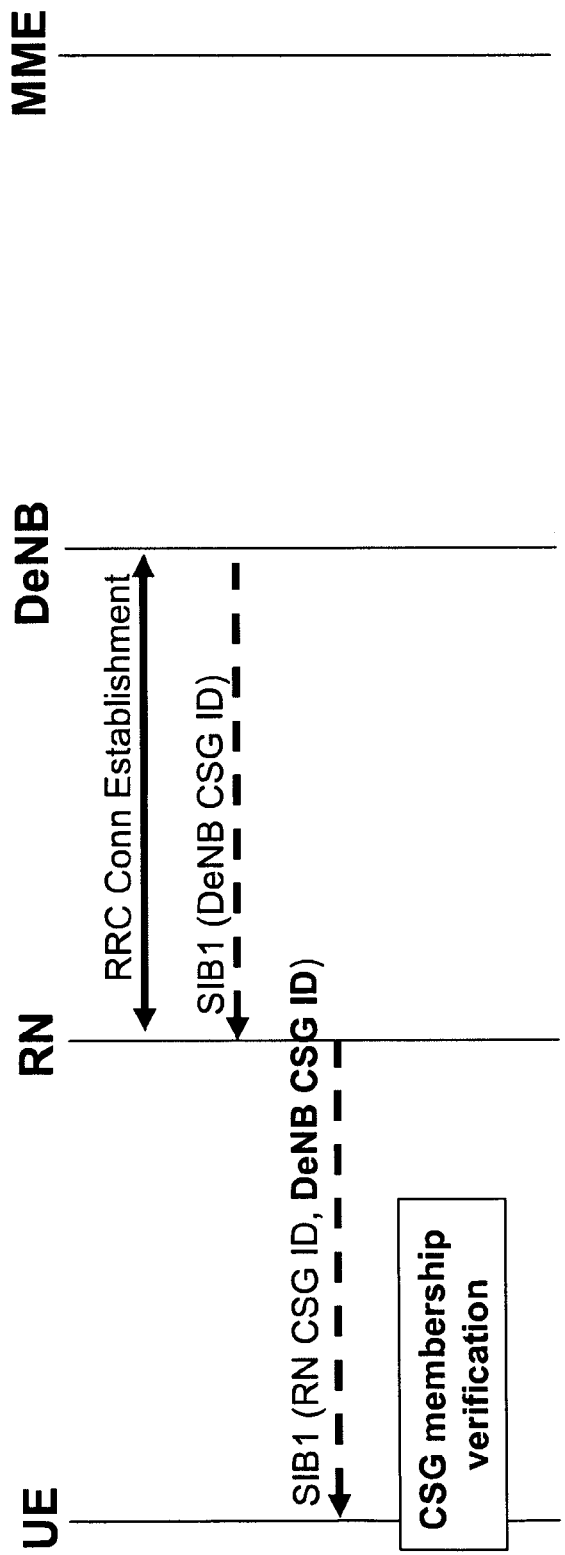
FIG. 8 shows a signalling diagram of another exemplary procedure of a CSG membership check for a relay cell at a RAN side according to exemplary embodiments of the present invention.
Figure 9:
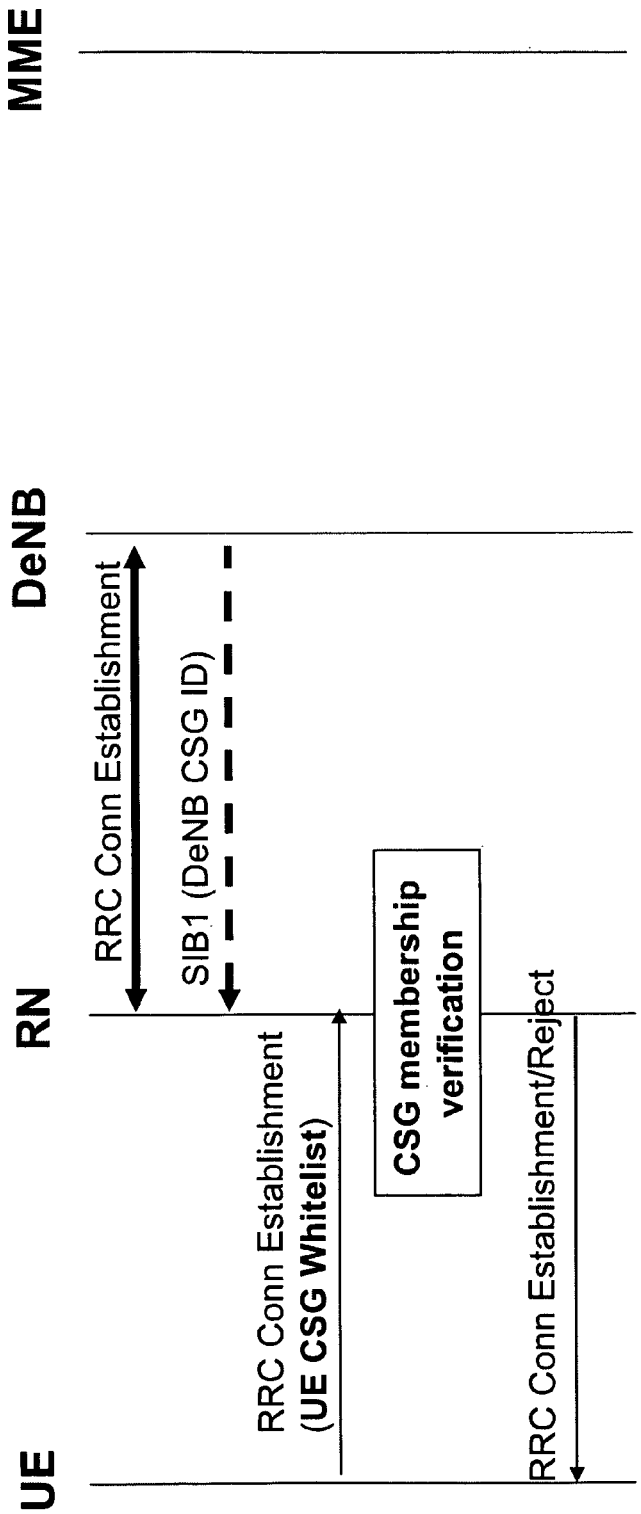
FIG. 9 shows a signalling diagram of still another exemplary procedure of a CSG membership check for a relay cell at a RAN side according to exemplary embodiments of the present invention.
Figure 10:
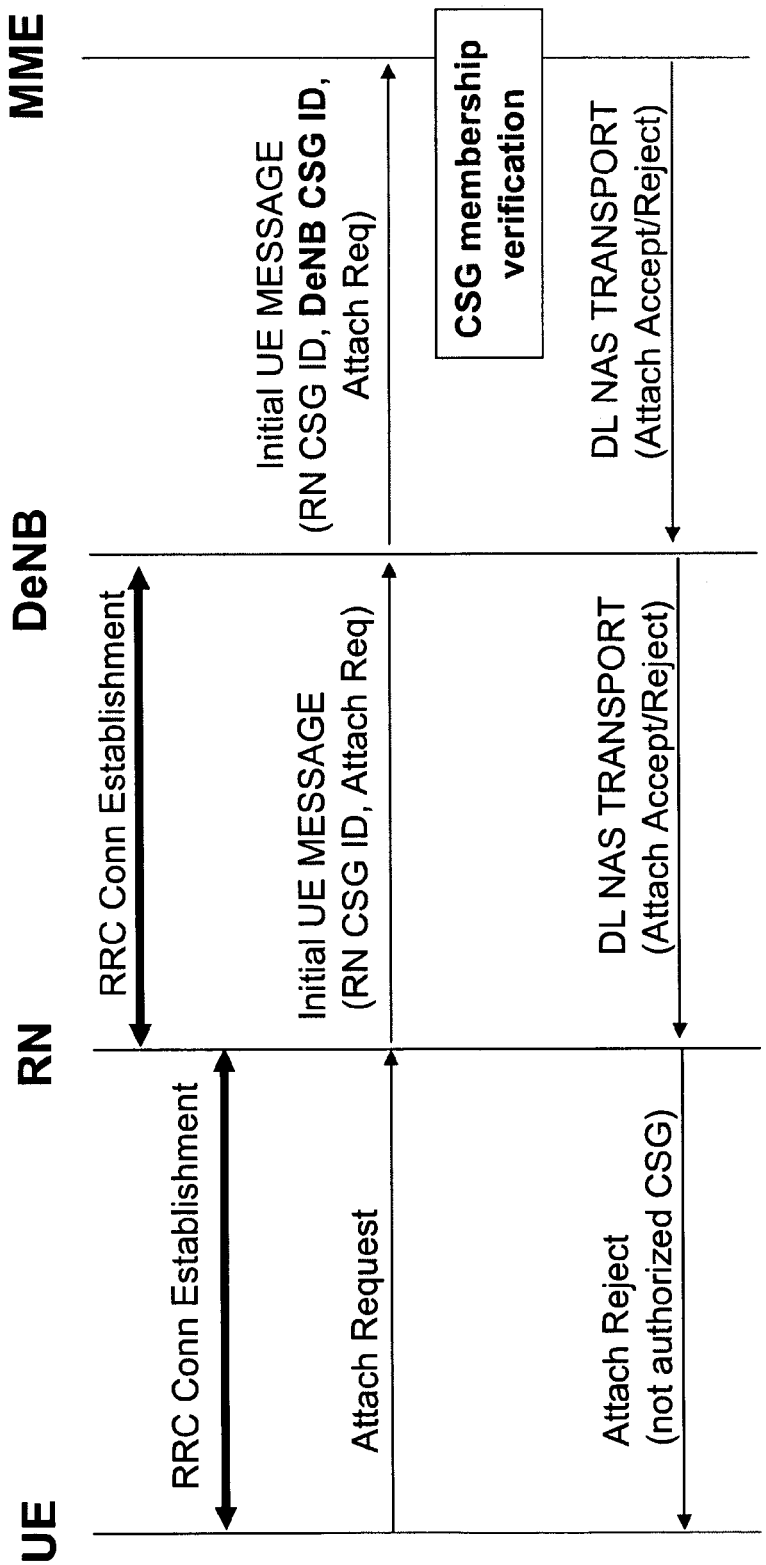
FIG. 10 shows a signalling diagram of an exemplary procedure of a CSG membership validation for a donor cell at a CN side according to exemplary embodiments of the present invention.

The exemplary method according to FIG. 5 may, for example, be performed by or at a UE according to FIGS. 7 and 8, a RN according to FIG. 9, and/or a MME according to FIG. 10.

As shown in FIG. 5, a method according to exemplary embodiments of the present invention may comprise an operation of retrieving setting information relating to closed subscriber groups of a donor base station and a relay node of a relay-enhanced cellular system (S51), an operation of acquiring a whitelist defining one or more closed subscriber groups in which a terminal is a member (S52), said terminal requesting access to the relay-enhanced cellular system via the relay node, and an operation of verifying a membership of the terminal for both closed subscriber groups of the donor base station and the relay node based on the retrieved setting information and the acquired whitelist (S53). A verifying operation may comprise an operation of comparing any one of identities of the closed subscriber groups of the donor base station and the relay node with entries in the whitelist (S53a). A method according to exemplary embodiments of the present invention may further comprise an operation of deciding on the allowance of an access of the terminal to the relay-enhanced cellular system via the relay node depending on the result of the verifying operation (S54). The verifying operation may yield that the terminal is a member of all relevant closed subscriber groups, e.g. both closed subscriber groups of the donor base station and the relay node, when each identity, e.g. each identity of the closed subscriber groups of the donor base station and the relay node, matches with an entry in the whitelist of the terminal. An access of the terminal to the relay-enhanced cellular system via the relay node may be allowed in the deciding operation, when the verifying operation yields that the terminal is a member of all relevant closed subscriber groups, e.g. both closed subscriber groups of the donor base station and the relay node.

Figure 6:
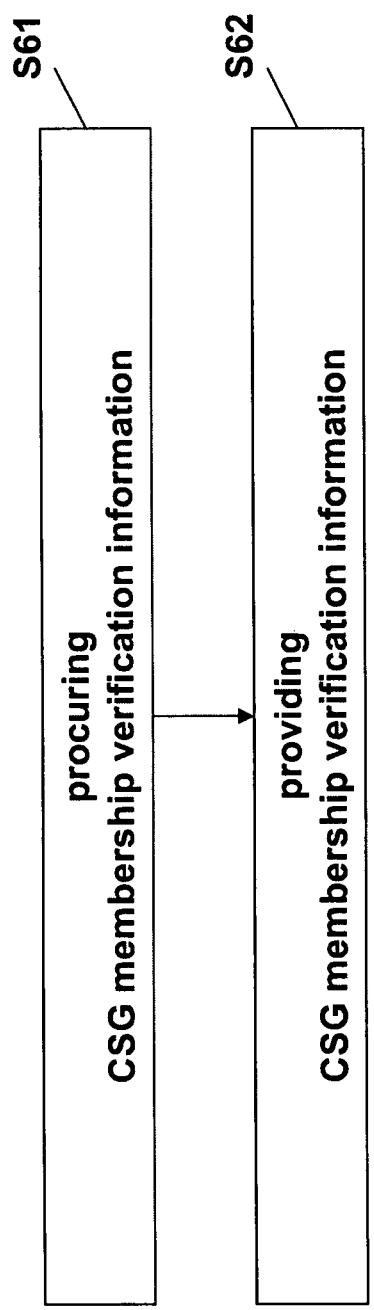
FIG. 6 shows a flowchart of another exemplary method according to exemplary embodiments of the present invention.

FIG. 6 shows a flowchart of another exemplary method according to exemplary embodiments of the present invention.

The exemplary method according to FIG. 6 may, for example, be performed by or at a RN according to FIGS. 7 and 8, a UE according to FIG. 9, and/or a DeNB according to FIG. 10.

As shown in FIG. 6, a method according to exemplary embodiments of the present invention may comprise an operation of procuring membership verification information for verifying a membership of a terminal for at least one closed subscriber group (S61), said terminal requesting access to a relay-enhanced cellular system via a relay node, and an operation of providing the procured membership verification information to an entity in charge of verifying the membership of the terminal (S62).

According to exemplary embodiments of the present invention, the membership verification information comprise setting information relating to at least one of closed subscriber groups of a donor base station and a relay node of the relay-enhanced cellular system or a whitelist defining one or more closed subscriber groups in which the terminal is a member. According to exemplary embodiments of the present invention, the setting information may comprise CSG-related parameters of the relay-enhanced cellular system. That is, the setting information may comprise any conceivable combination of CSG-related parameters of any relevant cell for s requested user/terminal access, in particular e.g. of the donor cell of the donor base station and/or the relay cell of the relay node. The CSG-related parameters of each relevant cell may comprise the parameters csg-indication and/or csg-identity as described above. The CSG-related parameters of a CSG cell may comprise a csg-indication of TRUE and a csg-identity, and the CSG-related parameters of a non-CSG or open cell may comprise a csg-indication of FALSE.

It may be regarded that the methods according to FIGS. 5 and 6 may represent counterparts of a cooperation of different entities within a common membership verification procedure according to exemplary embodiments of the present invention.

According to exemplary embodiments of the present invention, the method according to FIG. 5 and/or 6 may be applied for CSG handling (e.g. in user access control) for a relay cell at a RAN (radio access network) side, also referred to as CSG membership check, and/or CSG membership handling (e.g. in user access control) for a donor cell at a CN (core network) side, also referred to as CSG membership validation.

According to exemplary embodiments of the present invention, CSG handling (e.g. in user access control) for a relay cell at a RAN (radio access network) side, also referred to as CSG membership check, may be achieved as outlined below.

FIG. 7 shows a signalling diagram of an exemplary procedure of a CSG membership check for a relay cell at a RAN side according to exemplary embodiments of the present invention.

The exemplary procedure according to FIG. 7 basically comprises that a relay node RN advertises CSG-related parameters of a donor base station DeNB, in particular DeNB CSG identity detected from the DeNB, to its coverage, i.e. the relay cell in which a user/terminal requesting access is served.

Figure 3:
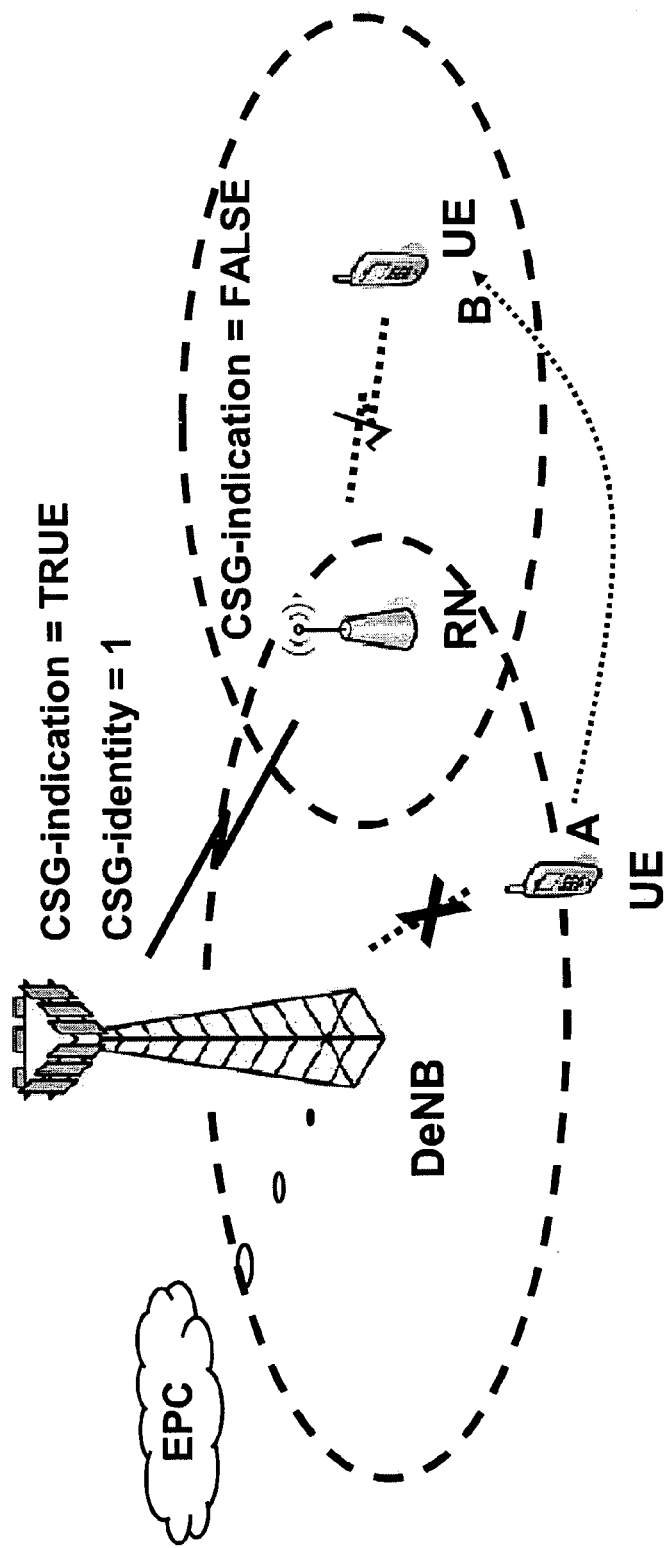
FIG. 3 shows a schematic diagram of an exemplary deployment scenario of a relay-enhanced cellular system where the DeNB represents a CSG cell while the RN does not represent a CSG cell.
Figure 4:
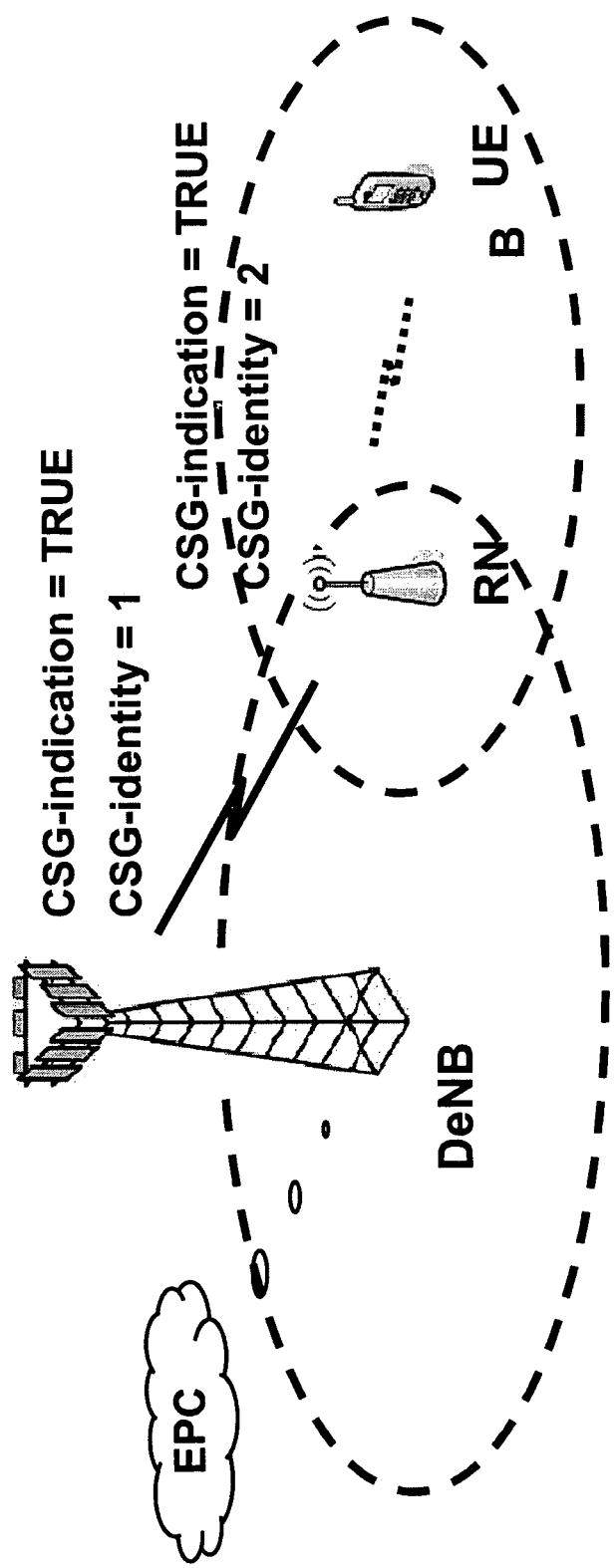
FIG. 4 shows a schematic diagram of an exemplary deployment scenario of a relay-enhanced cellular system where both DeNB and RN represent CSG cells but the RN has a different CSG identity as compared with its DeNB.

The exemplary procedure according to FIG. 7 may be particularly applicable for the exemplary deployment scenario according to any one of FIGS. 3 and 4.

As shown in FIG. 7, after RRC (radio resource control) connection establishment between the relay node RN and its serving donor base station DeNB, the RN may receive CSG-related parameters of the DeNB, in particular the DeNB CSG identity, which may for example be included in system information such as a system information block (SIB) 1. The RN may set the CSG-related parameters of the DeNB as its own CSG-related parameters (i.e., the RN may automatically set its CSG-related parameters to the same value detected from the DeNB). That is, the RN may copy the csg-indication and the csg-identity of the DeNB, which are retrieved/received from the DeNB. In the scenario according to FIG. 3, the RN does not have CSG-related parameters on its own (since no CSG is previously configured at the RN) and just copies those of the DeNB in respective places/placeholders. In the scenario according to FIG. 4, the RN has CSG-related parameters on its own (with which it is previously configured) and replaces its own CSG-related parameters with those of the DeNB; to this end, the RN may retrieve its own CSG-related parameters (namely, the RN CSG parameters may be stored in a local storage of the RN and locally obtained from there, or be configured/downloaded from OAM or another remote entity). Then, the RN may advertise these CSG-related parameters as its CSG setting information to its coverage, which may for example be included in system information such as a system information block (SIB) 1.

As shown in FIG. 7, the terminal UE may retrieve/receive the CSG-related parameters from the RN, e.g. in system information such as a system information block (SIB) 1. Using its own whitelist which may be locally acquired at the UE (namely, the whitelist may be stored in a local storage of the UE and locally obtained from there), the UE may verify (check) a membership of the UE for both closed subscriber groups. In the present exemplary case, such check is relevant for the CSG of the donor cell, since the relay cell is a non-CSG or open cell, which is evident for the UE from the CSG-related parameters retrieved/received from the RN. In this regard, the UE may compare the csg-identity of the RN (DeNB) with the entries of its whitelist, and may decide on the allowance of its access via the RN depending on whether or not the whitelist contains an entry matching this csg-identity of the RN (DeNB).

Since the RN is able to detect the CSG-related parameters of the DeNB, it is able to include and advertises it to its coverage. The UE is then able to determine to access the RN only when the csg-identity of the RN (DeNB) is within its whitelist. This procedure is invisible to the UEs and thus has good backward compatibility with legacy UEs.

According to exemplary embodiments of the present invention, for the procedure according to FIG. 7, the following features may be basically applicable.

At the UE, CSG setting information of DeNB and RN (wherein the CSG setting information of the DeNB are set as the CSG setting information of the RN) may be retrieved (i.e. received), the UE whitelist may be acquired (i.e. locally obtained), and the UE membership may be verified (i.e. checked) for the CSGs of RN and DeNB. Further, a decision on the allowance of UE access may be taken. The UE may be configured accordingly by way of corresponding means such as e.g. a correspondingly configured transceiver, processor, memory, or the like.

At the RN (which may be a relay node having a non-CSG or open cell in the scenario according to FIG. 3, or may be a relay node having a CSG cell in the scenario according to FIG. 4), CSG setting information of the DeNB may be retrieved (i.e. received) and used as (relevant) CSG setting information, and the thus (relevant) CSG setting information may be sent (i.e. advertised) to the relay cell (i.e. the UE). In the case of FIG. 3, the CSG setting information of the DeNB may be used as such (as the RN does not have own CSg setting information). In the case of FIG. 4, CSG setting information of the DeNB is aligned with the CSG setting information of the RN such that the DeNB CSG setting information replaces the RN CSG setting information. The RN may be configured accordingly by way of corresponding means such as e.g. a correspondingly configured transceiver, processor, memory, or the like.

FIG. 8 shows a signalling diagram of another exemplary procedure of a CSG membership check for a relay cell at a RAN side according to exemplary embodiments of the present invention.

The exemplary procedure according to FIG. 8 basically comprises that a relay node RN advertises CSG-related parameters of a donor base station DeNB, in particular DeNB CSG identity detected from the DeNB, to its coverage, i.e. the relay cell in which a user/terminal requesting access is served. The exemplary procedure according to FIG. 8 may be particularly applicable for the exemplary deployment scenario according to FIG. 4.

As shown in FIG. 8, after RRC (radio resource control) connection establishment between the relay node RN and its serving donor base station DeNB, the RN may receive CSG-related parameters of the DeNB, in particular the DeNB CSG identity, which may for example be included in system information such as a system information block (SIB) 1. The RN may retrieve its own CSG-related parameters (namely, the RN CSG parameters may be stored in a local storage of the RN and locally obtained from there, or be configured/downloaded from OAM or another remote entity), and may combine the RN CSG parameters with the DeNB CSG parameters (i.e., the RN may send both RN CSG parameters and DeNB CSG parameters together). Then, the RN may advertise these CSG-related parameters of RN and DeNB as CSG setting information of RN and DeNB together to its coverage, which may for example be included in system information such as a system information block (SIB) 1.

As shown in FIG. 8, the terminal UE may retrieve/receive the CSG-related parameters from the RN, e.g. in system information such as a system information block (SIB) 1. Using its own whitelist which may be locally acquired at the UE (namely, the whitelist may be stored in a local storage of the UE and locally obtained from there), the UE may verify (check) a membership of the UE for both closed subscriber groups. In the present exemplary case, such check is relevant for the CSG of the donor cell and the CSG of the relay cell, since both cells are CSG cells, which is evident for the UE from the CSG-related parameters retrieved/received from the RN. In this regard, the UE may compare the csg-identities of the RN and the DeNB with the entries of its whitelist, and may decide on the allowance of its access via the RN depending on whether or not the whitelist contains respective entries matching these csg-identities of the RN and the DeNB.

Since the RN is able to detect the CSG-related parameters of the DeNB, it is able to include and advertises it to its coverage. The UE is then able to determine to access the RN only when the csg-identities of the RN and the DeNB are within its whitelist. However, this procedure may be at the cost of radio resource over access link between RN and UE, and may not be applicable for legacy UEs which are not aware that DeNB and RN may have different CSG settings but perform CSG membership check for a single CSG ID only.

According to exemplary embodiments of the present invention, for the procedure according to FIG. 8, the following features may be basically applicable.

At the UE, CSG setting information of DeNB and RN may be retrieved (i.e. received), the UE whitelist may be acquired (i.e. locally obtained), and the UE membership may be verified (i.e. checked) for the CSGs of RN and DeNB. Further, a decision on the allowance of UE access may be taken. The UE may be configured accordingly by way of corresponding means such as e.g. a correspondingly configured transceiver, processor, memory, or the like.

At the RN (which may be a relay node having a CSG cell), CSG setting information of the DeNB may be retrieved (i.e. received) and CSG setting information of the RN may be retrieved (i.e. locally obtained or being configured/downloaded from OAM or another remote entity), the both CSG setting information may be combined or used together, and these CSG setting information may be sent (i.e. advertised) to the relay cell (i.e. the UE). The RN may be configured accordingly by way of corresponding means such as e.g. a correspondingly configured transceiver, processor, memory, or the like.

FIG. 9 shows a signalling diagram of still another exemplary procedure of a CSG membership check for a relay cell at a RAN side according to exemplary embodiments of the present invention.

The exemplary procedure according to FIG. 9 basically comprises that a terminal sends its CSG whitelist including CSG membership entries to a relay node, in particular to the relay node via which the UE requests access, i.e. the relay cell in which the user/terminal is served. The exemplary procedure according to FIG. 9 may be particularly applicable for the exemplary deployment scenario according to any one of FIGS. 3 and 4.

As shown in FIG. 9, after RRC (radio resource control) connection establishment between the relay node RN and its serving donor base station DeNB, the RN may receive CSG-related parameters of the DeNB, in particular the DeNB CSG identity, which may for example be included in system information such as a system information block (SIB) 1. The RN may retrieve its own CSG-related parameters (namely, the RN CSG parameters may be stored in a local storage of the RN and locally obtained from there or being configured/downloaded from OAM or another remote entity).

As shown in FIG. 9, the terminal UE may retrieve its CSG whitelist (namely, the whitelist may be stored in a local storage of the UE and locally obtained from there), and may send its CSG whitelist to the RN, i.e. its serving RN. In this regard, the whitelist may included in any uplink message, e.g. RRC connection request, RRC connection setup complete, Attach Request, UE capability information, or the like.

As shown in FIG. 9, the RN may acquire (i.e. receive) the whitelist of the UE, and may verify (check) a membership of the UE for both closed subscriber groups using the retrieved CSG parameters and the acquired (i.e. received) CSG whitelist of the UE. The retrieved CSG parameters may be those as described in connection with FIG. 7 (for the case according to FIG. 3), i.e. the DeNB CSG parameters being set as RN CSG parameters, or those as described in connection with FIG. 8 (for the case according to FIG. 4), i.e. both RN and DeNB CSG parameters being used together or in a combined manner). Accordingly, such check may be relevant for the CSG of the donor cell or for the CSG of the donor cell and the CSG of the relay cell. In this regard, the RN may compare the csg-identity of the DeNB or the csg-identities of the RN and the DeNB with the entries of the UE's whitelist, and may decide on the allowance of an access of the UE via the RN depending on whether or not the whitelist contains an entry or respective entries matching this csg-identity or these csg-identities.

As shown in FIG. 9, the RN may send a corresponding response to the UE, which indicates the result of the access allowance decision. In case access of the UE is decided to be allowed, the RN may send a RRC connection establishment accept message or a corresponding message to the UE, which message may be logically or functionally associated with the previously received message from the UE. In case access of the UE is decided to be not allowed, the RN may send to the UE a RRC connection reject message or a corresponding message in view of the previously received message from the UE.

Since the RN is able to detect the CSG-related parameters of the DeNB, it is able to determine whether to accept the UE's access based on the DeNB CSG-related parameters (e.g. ID) and the RN CSG-related parameters (e.g. ID) using the UE's CSG whitelist. This method may keep good backward compatibility with legacy UEs, but it is at the cost of an additional uplink message from the UE to the RN and may be endangered with a drawback in terms of computational efficiency especially with large CSG whitelists.

According to exemplary embodiments of the present invention, for the procedure according to FIG. 9, the following features may be basically applicable.

At the RN, CSG setting information of DeNB and RN may be retrieved (i.e. received and/or locally obtained or being configured/downloaded from OAM or another remote entity), the UE whitelist may be acquired (i.e. received), and the UE membership may be verified (i.e. checked) for the CSGs of RN and DeNB. Further, a decision on the allowance of UE access may be taken. Still further, a message indicating the result of the access decision may be sent to the UE. The RN may be configured accordingly by way of corresponding means such as e.g. a correspondingly configured transceiver, processor, memory, or the like.

At the UE, the CSG whitelist of the UE may be acquired (i.e. locally obtained) and may be sent to the RN. Further, a message indicating the allowance or non-allowance of its access may be received from the RN. The UE may be configured accordingly by way of corresponding means such as e.g. a correspondingly configured transceiver, processor, memory, or the like.

The above procedures for CSG handling (e.g. in user access control) for a relay cell at a RAN (radio access network) side, are applicable for the sake of CSG membership (pre-) checking. All of them may avoid waste of radio and core network resource in case that the access of the UE is eventually rejected at the core network side as described below.

According to exemplary embodiments of the present invention, CSG handling (e.g. in user access control) for a donor cell at a CN (core network) side, also referred to as CSG membership validation, may be achieved as outlined below.

FIG. 10 shows a signalling diagram of an exemplary procedure of a CSG membership validation for a donor cell at a CN side according to exemplary embodiments of the present invention, and The exemplary procedure according to FIG. 10 basically comprises that a donor base station additionally includes its CSG-related parameters into an UE message and forwards the thus enhanced message (containing both the CSG-related parameters of the DeNB and the CSG-related parameters of the RN) to a mobility management entity (MME) of (associated with) the relay-enhanced cellular system, in particular the MME serving the UE requesting access to the relay-enhanced cellular system via a relay node thereof. The exemplary procedure according to FIG. 10 may be particularly applicable for the exemplary deployment scenario according to any one of FIGS. 3 and 4.

As shown in FIG. 10, after RRC (radio resource control) connection establishment between the relay node RN and its serving donor base station DeNB as well as between the terminal UE and its serving relay node RN, the UE may send an attach request message to the RN. Upon receipt of the attach request message, the RN may include the attach request message from the UE together with its CSG-related parameters into an initial UE message, and may send this initial UE message to the DeNB. Upon receipt of the initial UE message, the DeNB may include its CSG-related parameters (which may be retrieved by way of being locally obtained from a local storage at the DeNB or being configured/downloaded from OAM or another remote entity) into the initial UE message, and may send the thus enhanced initial UE message to the MME.

Although not shown in FIG. 10, the MME may acquire the whitelist of the UE in some way. For example, the MME may receive the UE's CSG whitelist in any message relating to mobility management of the UE, or the MME may locally obtain the UE's CSG whitelist from a local storage in which the UE's CSG whitelist has been stored in advance. That is, it may be assumed that the MME is aware of the UE's CSG whitelist.

As shown in FIG. 10, the MME may verify (validate) a membership of the UE for both closed subscriber groups using the retrieved CSG parameters and the acquired CSG whitelist of the UE. The retrieved CSG parameters may be those as described in connection with FIG. 7 (for the case according to FIG. 3), i.e. the DeNB CSG parameters being set as RN CSG parameters, or—as assumed in FIG. 10—those as described in connection with FIG. 8 (for the case according to FIG. 4), i.e. both RN and DeNB CSG parameters being used together or in a combined manner). Accordingly, such check may be relevant for the CSG of the donor cell or—as assumed in FIG. 10—for the CSG of the donor cell and the CSG of the relay cell. In this regard, the MME may compare the csg-identity of the DeNB or—as shown in FIG. 10—the csg-identities of the RN and the DeNB with the entries of the UE's whitelist, and may decide on the allowance of an access of the UE via the RN depending on whether or not the whitelist contains an entry or respective entries matching this csg-identity or these csg-identities.

As shown in FIG. 10, the MME may send a corresponding response towards the UE (i.e. to the DeNB), which indicates the result of the access allowance decision. This response may be any arbitrary downlink message. In case access of the UE is decided to be allowed, the MME may send an attach accept message, which may for example be or be included in a DL (downlink) NAS (non-access stratum) transport message or a corresponding message in view of the previously received message from the DeNB. In case access of the UE is decided to be not allowed, the MME may send an attach reject message, which may for example be or be included in a DL (downlink) NAS (non-access stratum) transport message or a corresponding message in view of the previously received message from the DeNB. The thus sent message, upon receipt at the DeNB, may be forwarded from the DeNB to the RN. Then, the RN may extract the attach accept/reject message, and may send the same to the UE. In the exemplary case of FIG. 10, it is assumed that the attach request is rejected due to the existence of a CSG (at RN and/or DeNB) for which the UE is not authorized, which has been determined at the MME in the context of the UE membership verification (validation).

Since the MME is made aware of the CSG-related parameters of the RN and the DeNB. According to a conventional RN architecture, the RN is proxied to the DeNB and is invisible to the MME. Hence, from the MME's point of view, what the MME is made aware of are two CSG IDs associated with one DeNB. Due to the awareness of both CSG-related parameters of the RN and the DeNB, the MME is able to determine whether to accept the UE's access based on the DeNB CSG-related parameters (e.g. ID) and the RN CSG-related parameters (e.g. ID) using the UE's CSG whitelist. As mentioned above, the CSG membership is verified (validated) for both CSG IDs, i.e. the UE is authenticated/authorized successfully only when both CSG IDs are within its whitelist.

According to exemplary embodiments of the present invention, for the procedure according to FIG. 10, the following features may be basically applicable.

At the MME, CSG setting information of DeNB and RN may be retrieved received), the UE whitelist may be acquired (i.e. received and/or locally obtained), and the UE membership may be verified (i.e. validated) for the CSGs of RN and DeNB. Further, a decision on the allowance of UE access may be taken. Still further, a message indicating the result of the access decision may be sent to the DeNB (i.e. towards the UE). The MME may be configured accordingly by way of corresponding means such as e.g. a correspondingly configured transceiver, processor, memory, or the like.

At the DeNB, CSG setting information of the RN may be retrieved (i.e. received, e.g. within a message), CSG setting information of DeNB may be retrieved (i.e. locally obtained or being configured/downloaded from OAM or another remote entity), both CSG setting information of RN and DeNB may be included in a common message (i.e. a received message from the RN may be enhanced), and the message may be sent to the MME. Further, upon receipt of message indicating the result of an access decision from the MME, this message may be forwarded to the RN or the relevant attach accept/reject message may be sent to the RN. The DeNB may be configured accordingly by way of corresponding means such as e.g. a correspondingly configured transceiver, processor, memory, or the like.

The above procedure for CSG handling (e.g. in user access control) for a donor cell at a CN (core network) side, are applicable for the sake of CSG membership validation.

In FIGS. 7 to 10, the interface between UE and RN may be a wireless Uu interface, the interface between RN and DeNB may be a wireless Un interface, and the interface between the DeNB and the MME may be a (wireline) S1 interface.

According to exemplary embodiments of the present invention, both CSG membership check for a relay cell at a RAN side and CSG membership validation for a donor cell at a CN side may be achieved by way of an appropriate combination of the above-outlined procedures. In this regard, the procedure according to any one of FIGS. 7 to 9 may be combined with the procedure according to FIG. 10. That is, for the same user/terminal access control/process, the former may executed at the RAN side and the latter may be executed at the CN side. In this regard, even with a (pre-)checking at the Ran side, a final validation may be effected at the CN side.

According to exemplary embodiments of the present invention, the above procedures for CSG handling for a relay cell at a RAN side and/or the above procedure for CSG handling for a donor cell at a CN side are particularly applicable for user/terminal access control. That is, by way of these procedures according to exemplary embodiments of the present invention, a requested access of a user/terminal to a relay-enhanced cellular system via a relay node thereof may be properly handled.

It is noted that the above procedures may theoretically also applicable for RN access control. That is, by way of these procedures according to exemplary embodiments of the present invention, a requested access of a RN to a relay-enhanced cellular system via a donor base station thereof may be properly handled. Thereby, there may be provided a solution to the problem how the RN may access to the DeNB and how the RN should be authenticated at both RAN and CN sides.

However, a RN is not a UE anyway, and it is finally accessed to serve the UEs as a base station or access node. Therefore, the application of the above procedures for RNs and RN access is not required and/or expedient. According to exemplary embodiments of the present invention, it is proposed not to apply CSG membership verification ((pre-) check and/or validation) to RNs and RN access. Namely, when a RN is accessing to the DeNB, the RN could omit the CSG membership (pre-)checking and may access to the DeNB directly. Moreover, since the RN is able to indicate its identity/property as a relay node to the DeNB during its start-up procedure, the DeNB will not include its DeNB CSG ID in the initial UE message to the MME so that the MME could skip the CSG membership validation for the RN.

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIGS. 11 and 12, while for the sake of brevity reference is made to the detailed description of respective corresponding methods and operations according to any one of FIGS. 5 to 10 above as well as to the detailed description of an underlying network architecture according to any one of FIGS. 1 to 4 above.

Figure 11:
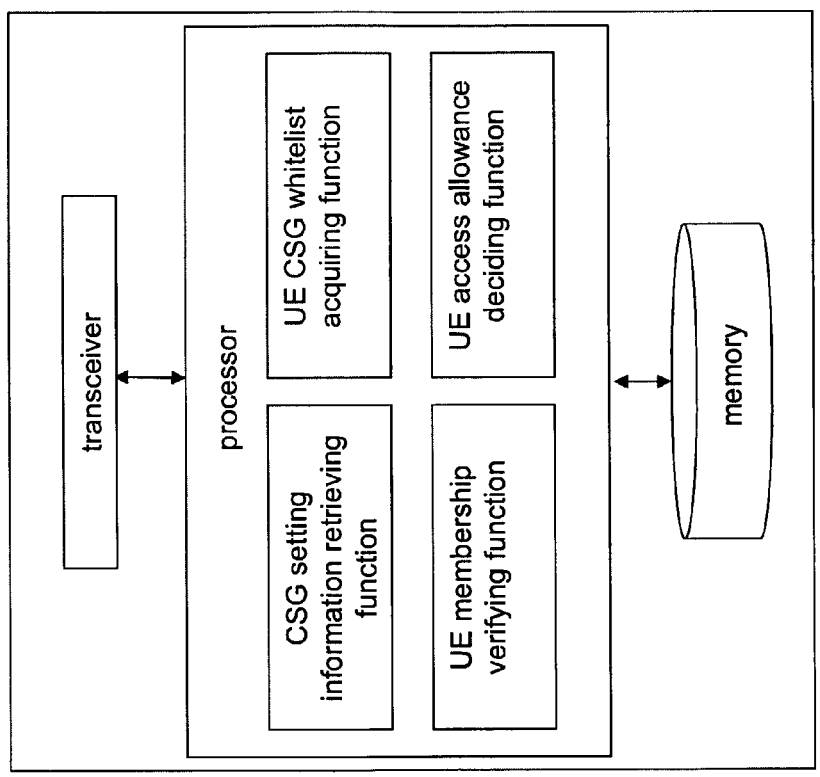
FIG. 11 shows a schematic block diagram of an exemplary device according to exemplary embodiments of the present invention.
Figure 12:
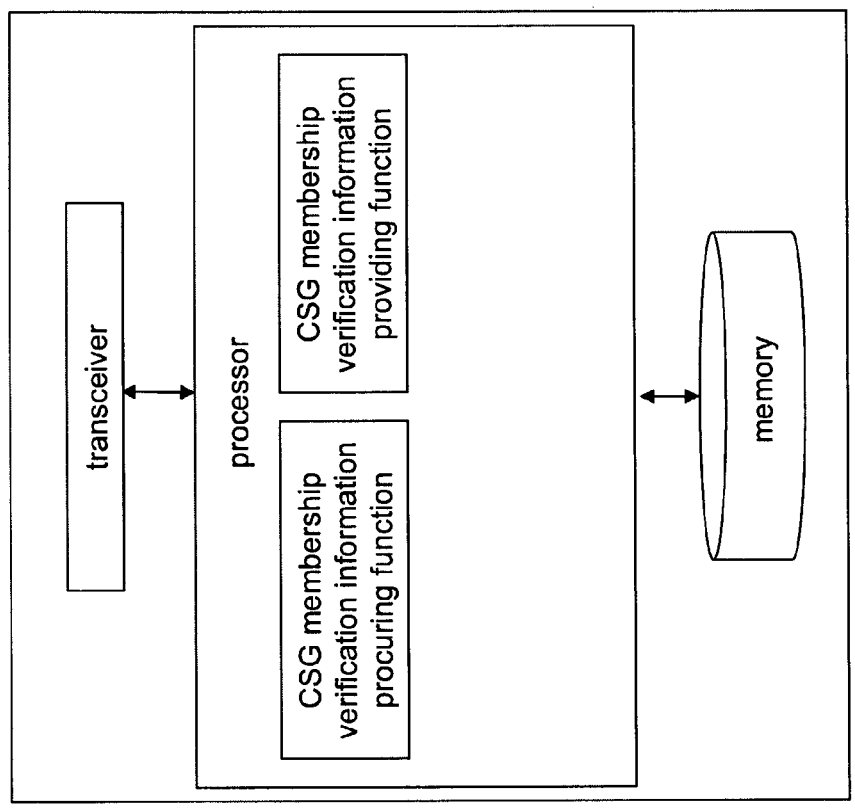
FIG. 12 shows a schematic block diagram of another exemplary device according to exemplary embodiments of the present invention.

In FIGS. 11 and 12 below, the solid line blocks are basically configured to perform respective operations as described above. The entirety of solid line blocks are basically configured to perform the methods and operations as described above, respectively. With respect to FIGS. 11 and 12, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIGS. 11 and 12, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 11 shows a schematic block diagram of an exemplary device according to exemplary embodiments of the present invention. The thus depicted device may be an apparatus according exemplary embodiments of the present invention, and any combination of the thus depicted device with an appropriate other device (as evident from FIGS. 7 to 10 above) may be a system according exemplary embodiments of the present invention.

In view of the above, the thus described apparatus may represent a (part of a) apparatus such as a terminal or user equipment UE in the case of FIGS. 7 and 8, a relay node RN in the case of FIG. 9, and/or a mobility management entity MME in the case of FIG. 10. In the case of FIGS. 7 and 8, the thus described apparatus may cooperate with a relay node RN as described above. In the case of FIG. 9, the thus described apparatus may cooperate with a terminal or user equipment UE and a donor base station DeNB as describe above. In the case of FIG. 10, the thus described apparatus may cooperate with a donor base station DeNB as described above.

According to FIG. 11, the apparatus is an apparatus according to exemplary embodiments of the present invention, which is configured to perform a procedure as described in conjunction with FIG. 5. Therefore, while basic functionalities are described hereinafter, reference is made to the above description according to FIG. 5 as well as the above description of a UE according to FIGS. 7 and 8, a RN according to FIG. 9 and/or a MME according to FIG. 10 for details thereof.

According to FIG. 11, the thus depicted apparatus according to exemplary embodiments of the present invention comprises a processor and a transceiver as well as, optionally, a memory.

The processor may be specifically configured to retrieve setting information relating to closed subscriber groups of a donor base station and a relay node of a relay-enhanced cellular system, thus representing means for retrieving RN and DeNB CSG setting information. In other words, the processor may have a corresponding CSG setting information retrieving function. The processor may be specifically configured to acquire a whitelist defining one or more closed subscriber groups in which a terminal is a member, said terminal requesting access to the relay-enhanced cellular system via the relay node, thus representing means for acquiring a UE CSG whitelist. In other words, the processor may have a corresponding UE CSG whitelist acquiring function. The processor may be specifically configured to verify (check/validate) a membership of the terminal for both closed subscriber groups of the donor base station and the relay node based on the retrieved setting information and the acquired whitelist, thus representing means for verifying (checking/validating) UE membership of closed subscriber groups. In other words, the processor may have a corresponding UE membership verifying function. For UE membership verification, the processor may be specifically configured to compare any one of CSG identities with entries in the UE CSG whitelist, thus representing means for comparing CSG identities with UE CSG whitelist entries. The UE membership verifying function of the processor may be adapted accordingly.

Further, the processor may be specifically configured to decide on the allowance of an access of the terminal to the relay-enhanced cellular system, thus representing means for deciding on UE access allowance. In other words, the processor may have a corresponding UE access allowance deciding function.

The transceiver may be specifically configured to receive and/or send relevant information and/or messages in the context of the above-described operations, procedures and functions. In the case of FIGS. 7 and 8, the transceiver may be specifically configured to receive from and/or to send to the RN. In the case of FIG. 9, the transceiver may be specifically configured to receive from and/or to send to the DeNB and/or the UE. In the case of FIG. 10, the transceiver may be specifically configured to receive from and/or to send to the DeNB.

The memory may be specifically configured to store relevant information and/or messages in the context of the above-described operations, procedures and functions. In other words, the memory may represent a local storage as describe above. In the case of FIGS. 7 and 8, the memory may be specifically configured to store the UE CSG whitelist. In the case of FIG. 9, the memory may be specifically configured to store the RN CSG setting information and, after receipt thereof, the UE CSG whitelist. In the case of FIG. 10, the memory may be specifically configured to store, after acquisition thereof, the UE CSG whitelist. In any case, the memory may be specifically configured to preliminary store any data, information or messages for processing, such as e.g. received CSG setting information to be used for UE membership verification, messages to be forwarded, or the like.

FIG. 12 shows a schematic block diagram of an exemplary device according to exemplary embodiments of the present invention. The thus depicted device may be an apparatus according exemplary embodiments of the present invention, and any combination of the thus depicted device with an appropriate other device (as evident from FIGS. 7 to 10 above) may be a system according exemplary embodiments of the present invention.

In view of the above, the thus described apparatus may represent a (part of a) apparatus such as a relay node RN in the case of FIGS. 7 and 8, a terminal or user equipment UE in the case of FIG. 9, and/or a donor base station DeNB in the case of FIG. 10. In the case of FIGS. 7 and 8, the thus described apparatus may cooperate with a terminal or user equipment UE as described above. In the case of FIG. 9, the thus described apparatus may cooperate with a relay node RN and a donor base station DeNB as describe above. In the case of FIG. 10, the thus described apparatus may cooperate with a mobility management entity MME as described above.

According to FIG. 12, the apparatus is an apparatus according to exemplary embodiments of the present invention, which is configured to perform a procedure as described in conjunction with FIG. 6. Therefore, while basic functionalities are described hereinafter, reference is made to the above description according to FIG. 6 as well as the above description of a RN according to FIGS. 7 and 8, a UE according to FIG. 9 and/or a DeNB according to FIG. 10 for details thereof.

According to FIG. 12, the thus depicted apparatus according to exemplary embodiments of the present invention comprises a processor and a transceiver as well as, optionally, a memory.

The processor may be specifically configured to procure membership verification information for verifying a membership of a terminal for at least one closed subscriber group, said terminal requesting access to a relay-enhanced cellular system via a relay node, thus representing means for procuring CSG membership verification information. In other words, the processor may have a corresponding CSG membership verification information procuring function. The processor may be specifically configured to provide the procured membership verification information to an entity in charge of verifying the membership of the terminal, thus representing means for providing CSG membership verification information. In other words, the processor may have a corresponding CSG membership verification information function.

The transceiver may be specifically configured to receive and/or send relevant information and/or messages in the context of the above-described operations, procedures and functions. In the case of FIGS. 7 and 8, the transceiver may be specifically configured to receive from and/or to send to the UE and/or the DeNB. In the case of FIG. 9, the transceiver may be specifically configured to receive from and/or to send to the RN. In the case of FIG. 10, the transceiver may be specifically configured to receive from and/or to send to the MME and/or the RN.

The memory may be specifically configured to store relevant information and/or messages in the context of the above-described operations, procedures and functions. In other words, the memory may represent a local storage as describe above. In the case of FIGS. 7 and 8, the memory may be specifically configured to store the RN CSG setting information and, after receipt thereof, the DeNB CSG setting information. In the case of FIG. 9, the memory may be specifically configured to store the UE CSG whitelist. In the case of FIG. 10, the memory may be specifically configured to store the DeNB CSG setting information and, after receipt thereof, the RN CSG setting information. In any case, the memory may be specifically configured to preliminary store any data, information or messages for processing, such as e.g. received CSG setting information to be used for UE membership verification, messages to be forwarded, or the like.

According to exemplarily embodiments of the present invention, a system may comprise any conceivable combination of the thus depicted apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

Generally, for the purpose of the present invention as described herein above, it should be noted that method steps and functions likely to be implemented as software code portions and being run using a processor at one of the entities, a network element, or a terminal (as examples of devices, apparatuses and/or modules thereof, or as examples of entities including apparatuses and/or modules therefor), are software code independent and can be specified using any known or future developed programming language, such as e.g. Java, C++, C, and Assembler, as long as the functionality defined by the method steps is preserved;

generally, any method step is suitable to be implemented as software or by hardware without changing the idea of the invention in terms of the functionality implemented;

method steps, functions, and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The present invention also covers any conceivable combination of method steps and operations described above, and any conceivable combination of nodes, apparatuses, modules or elements described above, as long as the above-described concepts of methodology and structural arrangement are applicable.

There are provided measures for the handling of closed subscriber groups in a relay-enhanced system, said measures exemplarily comprising retrieval of setting information relating to closed subscriber groups of a donor base station and a relay node of a relay-enhanced cellular system, acquisition of a whitelist defining one or more closed subscriber groups in which a terminal is a member, said terminal requesting access to the relay-enhanced cellular system via the relay node, and verification (i.e. check and/or validation) of a membership of the terminal for both closed subscriber groups of the donor base station and the relay node based on the retrieved setting information and the acquired whitelist. Said measures may exemplarily be applied for improving user access control via a relay node in relay-enhanced access networks.

The measures proposed according to exemplary embodiments of the present invention may be applied for any kind of relay-enhanced cellular system, such as for example for those in accordance with 3GPP RAN2/RAN3 standards and/or 3GPP LTE standards of release 10/11/12/ . . . (LTE-Advanced and its evolutions).

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

The invention claimed is:

1. A method comprising retrieving setting information relating to closed subscriber groups of a donor base station and a relay node of a relay-enhanced cellular system, acquiring a whitelist defining one or more closed subscriber groups in which a terminal is a member, said terminal requesting access to the relay-enhanced cellular system via the relay node, and verifying a membership of the terminal for both closed subscriber groups of the donor base station and the relay node based on the retrieved setting information and the acquired whitelist.

2. The method according to claim 1, further comprising allowing access of the terminal to the relay-enhanced cellular system via the relay node, when said verifying yields that the terminal is a member of both closed subscriber groups of the donor base station and the relay node.

3. The method according to claim 1, wherein the setting information comprise at least one of an identity of the closed subscriber group of the donor base station and an identity of the closed subscriber group of the relay node, the verifying comprises comparing any one of the identities of the closed subscriber groups with entries in the whitelist, and the verifying yields that the terminal is a member of both closed subscriber groups of the donor base station and the relay node, when each identity matches with an entry in the whitelist.

4. The method according to claim 1, wherein the method is operable at or by a mobility management entity associated with the relay-enhanced cellular system and wherein the retrieving comprises receiving the setting information relating to both closed subscriber groups of the donor base station and the relay node from the donor base station, and/or the setting information is included in an initial terminal message transferring an attach request of the terminal, and/or the acquiring comprises receiving the whitelist via the donor base station or locally obtaining the whitelist from a local storage of the mobility management entity, and/or the method further comprises sending an attach accept or reject message to the donor base station depending on the re-suit of the membership verifying.

5. The method according to claim 1, wherein the method is operable at or by the terminal, and wherein:

the retrieving comprises receiving the setting information relating to both closed subscriber groups of the donor base station and the relay node from the relay node, and/or the setting information is included in system information, and/or the acquiring comprises locally obtaining the whitelist at the terminal, and/or the whitelist is obtained from a local storage of the terminal.

6. The method according to claim 5, wherein the setting information comprises setting information relating to the closed subscriber group of the donor base station being set as setting information relating to the closed subscriber group of the relay node, or the setting information comprises both setting information relating to the closed subscriber group of the donor base station and setting information relating to the closed subscriber group of the relay node.

7. The method according to claim 1, wherein the method is operable at or by the relay node and wherein:

the retrieving comprises receiving the setting information relating to the closed subscriber group of the donor base station from the donor base station and obtaining the setting information relating to the closed subscriber group of the relay node at the relay node or from a remote entity, and/or the setting information relating to the closed subscriber group of the donor base station is included in system information, and/or the setting information relating to the closed subscriber group of the relay node is obtained from a local storage of the relay node.

8. The method according to claim 7, wherein the acquiring comprises receiving the whitelist from the terminal, and/or the whitelist is included in a connection establishment message, and/or the method further comprises sending a connection establishment accept or reject message to the terminal depending on the result of the membership verifying.

9. A computer program product including a non-transitory computer-readable medium comprising software code portions being arranged, when run on a processor of an apparatus, to perform the method according to claim 1.

10. An apparatus comprising at least one processor; and at least one memory including computer program code, the at least one memory and the computer program code configured, with the at least one processor, to cause the apparatus to perform at least the following:

retrieve setting information relating to closed subscriber groups of a donor base station and a relay node of a relay-enhanced cellular system, acquire a whitelist defining one or more closed sub-scriber groups in which a terminal is a member, said terminal requesting access to the relay-enhanced cellular system via the relay node, and verify a membership of the terminal for both closed sub-scriber groups of the donor base station and the relay node based on the retrieved setting information and the acquired whitelist .

11. The apparatus according to claim 10, wherein the at least one memory and the computer program code is further configured, with the at least one processor, to cause the apparatus to perform at least the following allow access of the terminal to the relay-enhanced cellular system via the relay node, when said verifying yields that the terminal is a member of both closed subscriber groups of the donor base station and the relay node.

12. The apparatus according to claim 10, wherein the setting information comprise at least one of an identity of the closed subscriber group of the donor base station and an identity of the closed subscriber group of the relay node, the at least one memory and the computer program code is further configured, for verifying, with the at least one processor, to cause the apparatus to perform at least the following: compare any one of the identities of the closed subscriber groups with entries in the whitelist, and yield that the terminal is a member of both closed subscriber groups of the donor base station and the relay node, when each identity matches with an entry in the whitelist.

13. The apparatus according to claim 10, wherein the apparatus is operable as or at a mobility management entity associated with the relay-enhanced cellular system, and wherein:

the apparatus further comprises a receiver configured to and/or the processor is further configured to receive the setting information relating to both closed subscriber groups of the donor base station and the relay node from the donor base station, and/or the setting information is included in an initial terminal message transferring an attach request of the terminal, and/or the apparatus further comprises a receiver configured to and/or the at least one processor, for acquiring, is further configured to receive the whitelist via the donor base station, or the processor, for acquiring, is further configured to locally obtain the whitelist from a local storage of the mobility management entity, and/or the apparatus further comprises a transmitter configured to and/or the processor is further configured to send an attach accept or reject message to the donor base station depending on the result of the membership verifying.

14. The apparatus according to claim 10 wherein the apparatus is operable as or at the terminal, and wherein:

the apparatus further comprises a receiver configured to and/or the processor is further configured to receive the setting information relating to both closed subscriber groups of the donor base station and the relay node from the relay node, and/or the setting information is included in system information, and/or the processor, for acquiring, is further configured to locally obtain the whitelist at the terminal, and/or the apparatus further comprises a local storage storing the whitelist, wherein the whitelist is obtainable from the local storage of the terminal.

15. The apparatus according to claim 14, wherein the setting information comprises setting information relating to the closed subscriber group of the donor base station being set as setting information relating to the closed subscriber group of the relay node, or the setting information comprises both setting information relating to the closed subscriber group of the donor base station and setting information relating to the closed subscriber group of the relay node.

16. The apparatus according to claim 10, wherein the apparatus is operable as or at the relay node, and wherein:

the apparatus further comprises a local storage storing the whitelist, wherein the whitelist is obtainable from the local storage of the terminal, and/or the apparatus further comprises a receiver configured to and/or the processor is further configured to receive the setting information relating to the closed subscriber group of the donor base station from the donor base station, and the processor is further configured to obtain the setting information relating to the closed subscriber group of the re-lay node at the relay node or from a remote entity, and/or the setting information relating to the closed subscriber group of the donor base station is included in system information.

17. The apparatus according to claim 16, wherein the apparatus further comprises a receiver configured to and/or the processor is further configured to receive receiving the whitelist from the terminal, and/or the whitelist is included in a connection establishment message, and/or the apparatus further comprises a transmitter configured to and/or the processor is further configured to send a connection establishment accept or reject message to the terminal depending on the result of the membership verifying.

18. A method comprising procuring membership verification information for verifying a membership of a terminal for at least one closed sub scriber group, said terminal requesting access to a relay-enhanced cellular system via a relay node, and providing the procured membership verification information to an entity in charge of verifying the membership of the terminal, wherein:

said membership verification information comprise setting information relating to at least one of closed subscriber groups of a donor base station and a relay node of the relay-enhanced cellular system or a whitelist defining one or more closed subscriber groups in which the terminal is a member, and the setting information comprise at least one of an identity of the closed subscriber group of the donor base station and an identity of the closed subscriber group of the relay node.

19. The method according to claim 18, wherein
the method is operable at or by the donor base station.

20. The method according to claim 19, wherein
the membership verification information comprise the setting information, and
the procuring comprises:
receiving the setting information relating to the closed subscriber group of the relay node from the relay node,
retrieving the setting information relating to the closed subscriber group of the donor base station, and
sending both the received setting information and the retrieved setting information to a mobility management entity associated with the relay-enhanced cellular system as the entity in charge of verifying the member- ship of the terminal.

21. The method according to claim 18, wherein
the method is operable at or by the relay node.

22. The method according to claim 21, wherein
the membership verification information comprise the setting information, and
the procuring comprises:
receiving the setting information relating to the closed subscriber group of the donor base station from the donor base station, using the received setting information as the setting information, and
sending the setting information to the terminal as the entity in charge of verifying the membership of the terminal.

23. The method according to claim 22, wherein
the method further comprises retrieving the setting information relating to the closed subscriber group of the relay node, and
wherein the aligning comprises aligning the received setting information and the retrieved setting information and using the received setting information as the setting information.

24. The method according to claim 21, wherein
the membership verification information comprise the setting information, and
the procuring comprises:
receiving the setting information relating to the closed subscriber group of the donor base station from the donor base station,
retrieving the setting information relating to the closed subscriber group of the relay node,
sending both the received setting information and the retrieved setting information to the terminal as the entity in charge of verifying the membership of the terminal.

25. The method according to claim 18, wherein
the method is operable at or by the terminal, and wherein:
the membership verification information comprise the whitelist, and
the procuring comprises:
acquiring the whitelist, and
sending the whitelist to the relay node as the entity in charge of verifying the membership of the terminal.

26. A computer program product including a non-transitory computer-readable medium comprising software code portions being arranged, when run on a processor of an apparatus, to perform the method according to claim 18.

27. An apparatus comprising
at least one processor; and
at least one memory including computer program code,
the at least one memory and the computer program code configured, with the at least one processor, to cause the apparatus to perform at least the following:
procure membership verification information for verifying a membership of a terminal for at least one closed subscriber group, said terminal requesting access to a relay-enhanced cellular system via a relay node, and
provide the procured membership verification information to an entity in charge of verifying the membership of the terminal, wherein:
said membership verification information comprise setting information relating to at least one of closed subscriber groups of a donor base station and a relay node of the relay-enhanced cellular system or a whitelist defining one or more closed subscriber groups in which the terminal is a member, and
the setting information comprise at least one of an identity of the closed subscriber group of the donor base station and an identity of the closed subscriber group of the relay node.

* * * * *